UNITED STATES PATENT OFFICE.

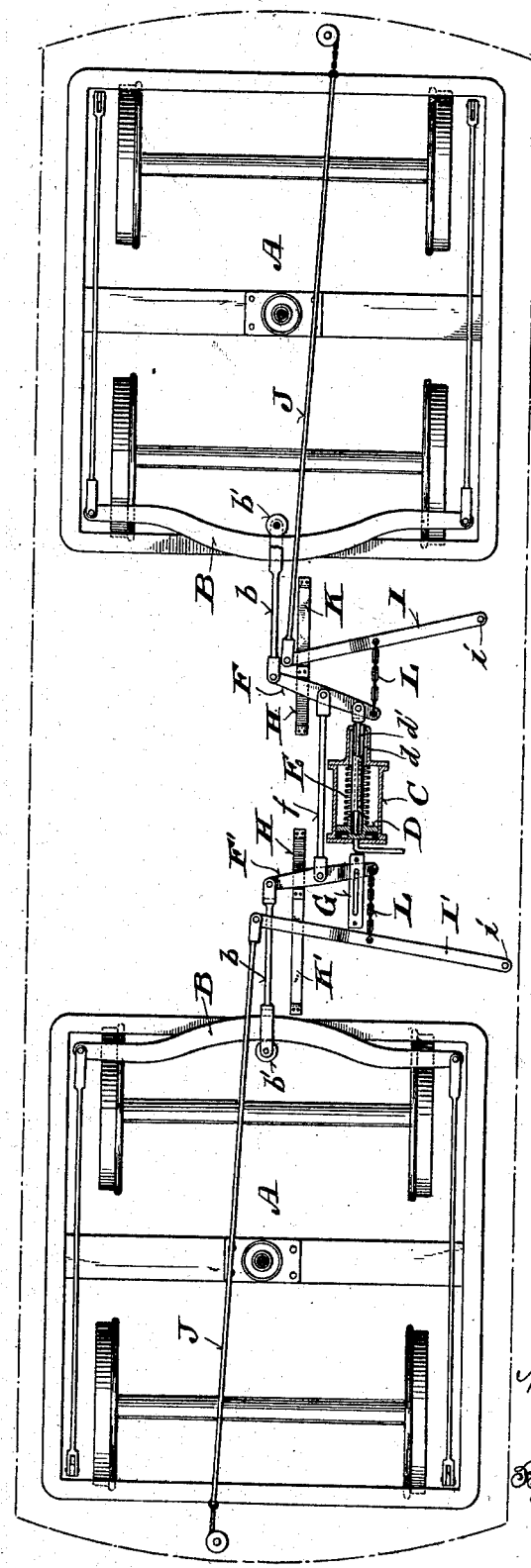

NIELS A. CHRISTENSEN, OF MILWAUKEE, WISCONSIN.

BRAKE-LEVER SYSTEM FOR RAILWAY-CARS.

SPECIFICATION forming part of Letters Patent No. 681,103, dated August 20, 1901.

Application filed December 3, 1898. Serial No. 698,134. (No model.)

*To all whom it may concern:*

Be it known that I, NIELS A. CHRISTENSEN, a subject of the King of Denmark, residing at Milwaukee, in the county of Milwaukee and State of Wisconsin, have invented certain new and useful Improvements in Brake-Lever Systems for Railway-Cars, of which the following is a specification, reference being had to the accompanying drawing, forming a part thereof.

The main objects of my invention are to insure the operation of both power and hand connections on the brakes of either truck in case the connection between the lever system and the brakes of the other truck is broken, to enable the power connections to operate independently of and without effect upon the hand connections, to enable either hand connection to operate the brakes of both trucks in case the other hand connection is broken, and generally to simplify the construction and operation of combined hand and power brake-lever systems.

It consists in certain novel features of construction and arrangement of parts, as hereinafter particularly described, and pointed out in the claims.

The accompanying drawing shows a plan view of the running-gear of a two-truck railway-car to which my improved brake-lever system is applied.

A A designate the trucks of a car, and B B the arches or curved bars through which and their connections the brakes, which are not shown, are applied without interfering with the turning of the trucks upon curves. These arches are such as are commonly employed in railway-cars for this purpose and may, like the trucks and brakes, be of the usual or any suitable form and construction and have the ordinary operating connections with the brake beams and shoes, a part only of such connections being shown in the drawing.

C is the brake-cylinder of ordinary air or power brake apparatus. It is attached to the car-body, lengthwise thereof, and is provided with a piston D, having a tubular stem $d$, within which a rod $d'$ telescopes, so as to permit of a hand application of the brakes without moving the piston D, as hereinafter explained. A spring E, placed around the tubular stem of the piston and bearing at one end against the piston and at the other end against the opposite cylinder-head, acts in opposition to the air or fluid pressure to return said piston to its starting-point when the air or other actuating fluid is released from said cylinder. This is like or similar to the construction heretofore employed with this class of brake-lever systems, and no invention is claimed therein.

F F' are levers arranged transversely to and at opposite ends of the brake-cylinder. They are connected with each other between their ends by a rod $f$, pivoted thereto and running approximately parallel to the brake-cylinder. At their ends farthest from the brake-cylinder they are connected with the arches B B of the car-trucks by rods $b\ b$, pivoted to said levers and forked to pass loosely around said arches. These rods $b\ b$ are provided in their forked ends with rollers $b'\ b'$, which bear against the outer sides or edges of said arches, thus facilitating the turning of the trucks in passing curves when the brakes are applied.

The lever F is pivotally connected with the piston-rod $d'$, and the lever F' has a fulcrum bearing at the opposite end of the brake-cylinder in a slotted guide G, attached to the car-body in line or parallel with the piston-rod $d'$. A pivot-pin engaging loosely with the slot in said guide serves as the fulcrum of said lever in power applications of the brakes.

H H' are guides through which the levers F F' pass between their connecting-rod $f$ and the rods $b\ b$. The ends of these guides serve as stops to limit the movement of said levers and under certain conditions as fulcrums therefor.

I I' are levers fulcrumed at one end, as at $i\ i$, to the car-body and pivotally connected at the other end with the hand brake-rods J J', which are in turn connected at their outer ends by chains with the hand brake-shafts in the usual way. The free or movable ends of these levers I I' pass through guides K K', which may be conveniently formed as extensions of the guides H H'. Between their ends the levers I I' are connected by chains L L or other suitable flexible or jointed connections with the levers F F' at the ends opposite their connections with the rods $b\ b$. This construction and arrangement of the lever system is adapted to cars in which the bodies are hung low, so that hand brake connections passing outside of the trucks would interfere with the turning of the trucks.

The apparatus operates as follows: In making a power application of the brakes the piston D is forced by the admission of compressed air or other fluid toward the lever F, thus tending to turn the adjacent end of said lever outwardly and its opposite end inwardly. This acts through the rod $b$ to apply the brakes of the truck at the right and through the rod $f$ to turn the lever F' to the right, and this movement of lever F', acting through its connecting-rod $b$, applies the brakes on the car-truck at the left. In the foregoing operations the lever F fulcrums on its pivot connection with the rod $f$, the lever F' fulcrums on its pivot-pin at the inner end of the guide G, and the chains L are slacked, so that no pull is exerted by a power application of the brakes upon the hand connections I and J, and such application will be made independently of said hand connections.

In case the connections between either lever F or F' and the brakes of either truck are broken the other lever will operate independently thereof to apply the brakes on the other truck. For instance, if the connection between the lever F and the brake mechanism of the truck at the right is broken the stop at the inner end of the guide H will serve as a fulcrum-bearing for said lever to operate the lever F', as hereinbefore explained, for the application of the brakes on the truck at the left. On the other hand, if the brake connection of the lever F' should be broken or disengaged the stop at the inner end of the guide H' would serve as a fulcrum-bearing for said lever to operate the lever F in applying the brakes on the truck at the right.

To make the hand application of the brakes, either of the levers I or I' is turned outwardly by means of its hand connections. When the brakes are set up, the lever I, acting directly upon the lever F, withdraws the rod $d'$ from the tubular stem of piston D without moving said piston. In other respects the operation is the same as that produced by air or fluid pressure upon said piston, as above explained.

When the brakes are applied through the hand connection at the left, the lever I', acting on the lever F', moves its pivot-pin away from the bearing at the inner end of the guide G and turns said lever on its pivot connection with the rod $f$ as a fulcrum. In this operation the lever F', acting through the rod $f$, turns the lever F on its pivot connection with the piston-rod $d'$ as a fulcrum. It is obvious that the disconnecting or breaking of either of the hand connections beyond the levers F or F' will not interfere with the successful operation of the other hand connection or with the power application of the brakes by means of the cylinder and piston.

Various modifications and changes in minor details of construction may be made without affecting the operation of the apparatus or departing from the spirit and intended scope of the invention.

I claim—

1. In a brake-lever system for railway-cars, the combination with the brake-cylinder and piston, of a pair of levers connected with each other by a rod and each connected with the brakes of one of the car-trucks, one lever having an operating connection with said piston and the other a shifting fulcrum movable parallel with the rod connecting said levers, stops for limiting the movement of said levers whereby the brakes of one truck may be applied if the connection with the brakes of the other truck is broken, and a lever having a hand operating connection and a flexible or jointed connection with said lever, which has a shifting fulcrum, substantially as and for the purposes set forth.

2. In a brake-lever system for railway-cars the combination with the brake-cylinder and piston, of a pair of levers connected with each other by a rod and each connected with the brakes of one of the car-trucks, one lever having an operating connection with said piston and the other a fulcrum-bearing, stops for limiting the movement of said levers, whereby the brakes of one truck may be applied if the connection with the brakes of the other truck is broken, two levers each having a hand operating connection and a flexible or jointed connection with one of said pair of levers, whereby a power application of the brakes may be made without shifting the hand-operated levers, substantially as and for the purposes set forth.

3. In a brake-lever system for railway-cars the combination of a pair of levers connected with each other by a rod and each having a connection with the brakes of one car-truck, stops for limiting the movement of said levers, whereby the brakes of either truck may be applied if the connection with the brakes of the other truck is broken, two levers each having a hand operating connection and a connection with each of said pairs of levers on the opposite side of the connecting-rod from the brake connection, substantially as and for the purposes set forth.

In witness whereof I hereto affix my signature in presence of two witnesses.

NIELS A. CHRISTENSEN.

Witnesses:
 CHAS. L. GOSS,
 ELINOR V. WRIGHT.